(12) United States Patent  
Guyer

(10) Patent No.: US 8,134,778 B2  
(45) Date of Patent: Mar. 13, 2012

(54) MONOLITHIC ECCENTRIC MERSENNE-CASSEGRAIN TELESCOPE

(75) Inventor: Robert C. Guyer, Beverly, MA (US)

(73) Assignee: BAE Systems Information and Electronic Systems Integrations Inc., Nashua, NH (US)

(\*) Notice: Subject to any disclaimer, the term of this patent is extended or adjusted under 35 U.S.C. 154(b) by 415 days.

(21) Appl. No.: 12/436,850

(22) Filed: May 7, 2009

(65) Prior Publication Data

US 2010/0284099 A1    Nov. 11, 2010

(51) Int. Cl.
*G02B 23/00*    (2006.01)
(52) U.S. Cl. ........................................ 359/399
(58) Field of Classification Search .............. 359/399
See application file for complete search history.

(56) References Cited

U.S. PATENT DOCUMENTS 5,181,145 A * 1/1993 Eden .............................. 359/859
2008/0170311 A1* 7/2008 Yafuso .......................... 359/852

\* cited by examiner

*Primary Examiner* — Alessandro Amari
(74) *Attorney, Agent, or Firm* — Daniel J. Long; Robert K. Tendler

(57) ABSTRACT

A Mersenne-Cassegrain telescope provided in a single block of glass in which opposed parabolic elements are precision milled through diamond turning of a glass boule, with the magnification power of the telescope determined by the differences in focal length between the two parabolas. The result is a volumetrically small telescope with pre-aligned surfaces that are maintained by the structural rigidity of the glass itself and in which thermal coefficients of expansion, vibration and the like have no effect due to the single glass element structure.

16 Claims, 6 Drawing Sheets

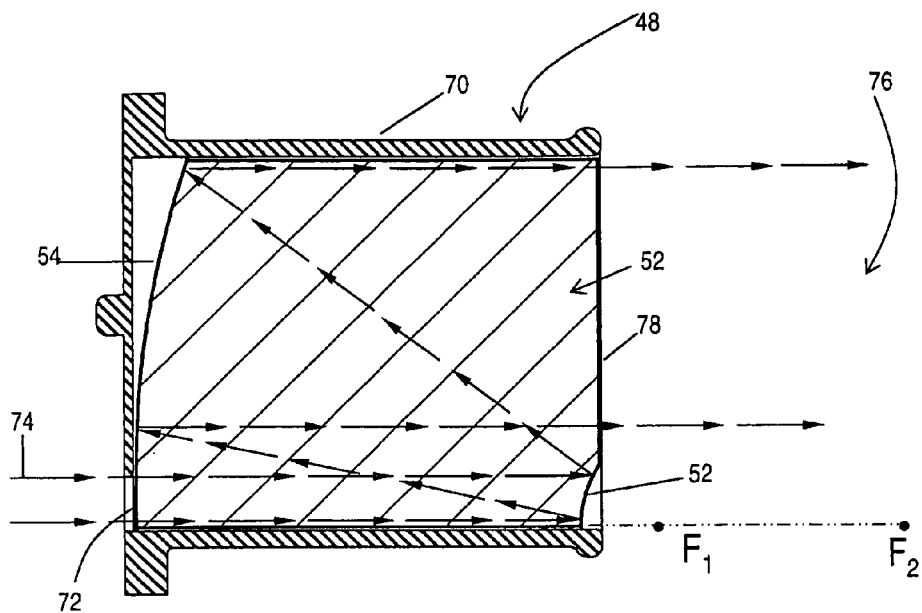
Fig. 10
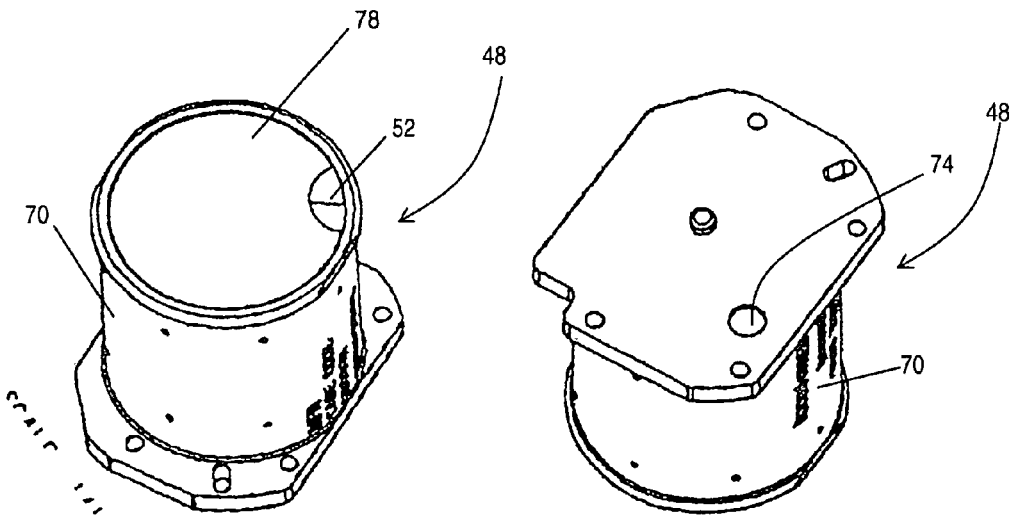
Fig. 11   Fig. 12

MONOLITHIC ECCENTRIC MERSENNE-CASSEGRAIN TELESCOPE

FIELD OF THE INVENTION

This invention relates to a compact single element monolithic eccentric Mersenne-Cassegrain telescope and its use in laser systems.

BACKGROUND OF THE INVENTION

Typical beam expanding telescopes are refractive involving a negative input lens in line with a positive objective lens; or are reflective involving a concave primary or input mirror reflecting to a concave secondary mirror. In these cases, the ratio of focal lengths defines the power or magnification of the telescope. Such telescopes are typically mounted in metal housings, precision aligned, and sealed against environment. The problem with these prior telescopes is that they include alignment features or mechanisms adding weight and volume, and are prone to misalignment from outside sources. Thus, the disadvantages of such telescopes are that they are larger, less inherently stable, and subject to contamination. This is of concern when the telescopes are used in harsh military environments.

Confronted with optical performance requirements vs. size/space allocations on a recent gimbal mounted military laser target designator countermeasure system, a new telescope needed to be designed which would enhance optical performance and system stability. The configuration would have to be the smallest, most compact telescope of comparable performance one could build. It is noted that conventional afocal, no common focus, telescopes consist of two parabolic surfaces with a common axis of rotation, but with different focal lengths, spaced and supported by stable structures. Just as the power of a sighting telescope describes image magnification mentioned above, the power of the telescope when used to project laser energy describes reduction of laser beam divergence to provide a tighter, smaller beam on the intended target. Beam divergence is reduced by the power of the telescope, and energy on target increases by the square of that power.

There is therefore a requirement to provide a stable miniaturized telescope that will fit into the gimbal. Ordinarily when one, for instance, seeks to have an 8 power telescope. As described above, one would use refracting optics with a negative lens and expand the beam to a positive lens, with the ratio of the apertures defining the power out of the telescope. Thus, if one requires an 8 power telescope in order to get the beam focused for long range applications, one needs to design an 8 power telescope to fit into the tightly packaged gimbal. Size, weight, and alignment are the important design considerations, just as temperature, shock, and vibration are the important environmental concerns.

It will be appreciated that most telescopes have multiple elements which creates a variety of alignment problems including spacing, temperature coefficients of expansion, vibration mounting and the like. In order to design such a telescope one has to match coefficient of expansion of the housing to the elements so that one doesn't move one element relative to the other and therefore defocus or misalign the telescope.

It will also be appreciated that mounting and aligning multiple elements such as negative and positive lenses takes up a fair amount of space, regardless of whether or not environmental problems can be solved.

Therefore in laser target designators and other gimbal mounted laser systems, there is a requirement for a telescope that is extremely compact and immune to environmental factors which can cause optical aberrations and unwanted beam divergence, and which also can contribute to aiming errors.

SUMMARY OF INVENTION

The above problems are solved by providing a new telescope that is unique in that two mirror surfaces, primary and secondary, are formed in a single piece of glass and this glass is the stable metering structure maintaining their spatial relationship. The surfaces cannot go out of alignment as precision is machined in rather than aligned in. As the primary and secondary reflective surfaces are on a common optical substrate with no separating air interface, they cannot be contaminated or scratched, with coatings protecting the rear of the surfaces. One of the purposes is to be able to illuminate a target many miles away so as to focus target defining energy onto unexploded ordinances, submarines and the like, or for instance to countermeasure missiles that are aimed at an aircraft.

More specifically, the telescope is an afocal telescope, i.e. one having no internal focus, that consists of an entrance window, primary and secondary parabolic mirrors, and an exit window, all created using a single piece of glass. Diamond turning lathes form and locate critically positioned surfaces to a precision exceeding conventional alignment methods. By virtue of the telescope being a single piece of glass, the telescope is both miniaturized and cannot go out of alignment from external influences of shock, vibration, or temperature.

As will be appreciated, the traditional way to make telescope lenses is to take a glass blank, put it in a spindle and polish it for a long period of time to form a lens, and then assemble these lenses into a structure. This type of process is too inexact for the subject invention.

In order to provide for the subject compact telescope, a single block of glass is utilized which is diamond turned to form a precision Mersenne-Cassegrain telescope involving negative and positive parabolas milled onto external surfaces of the glass block in which the parabolas have their foci on a common offset axis. Thereafter the exterior of the milled glass having the parabolic surfaces is coated with reflective material. Note that diamond turning is a technique perfected by The Corning Glass Company replacing older grinding and polishing operations on glass optics.

Diamond turning involves a very high precision lathe running on air bearings, and provides the ability to shape glass to a very fine surface finish in which the surfaces themselves also have an extremely good relationship one surface to the other.

As mentioned above, the block of glass is configured such that it takes on a Mersenne-Cassegrain configuration in which an incoming light beam having for instance an 8 milliradian divergence characteristic is reflected back by a negative parabolic reflector to an opposed positive parabolic surface, with the ratio of the focal lengths being 8:1, to provide an 8 power telescope. The result is an exit beam confined to a well collimated beam with a 1 milliradian divergence angle.

In one embodiment, the block of glass is configured such that at the entrance port is a flat surface which passes the incoming light beam through the glass to the internally carried negative parabolic surface made reflective by coating the exterior of the glass surface with a reflective material. This negative parabolic surface at the end of the glass opposite the input end redirects the beam towards a positive parabolic surface at the input end of the block, this positive parabolic surface being provided with an exterior reflective coating. In one embodiment, this positive parabolic surface has a focal length that is 8 times that of the parabolic surface that forms the first optical focusing element. Upon reflection at the second coated parabolic surface, the beam emerges in a co-linear fashion so as to provide a diffraction limited collimated beam.

In essence, the exterior surface of the glass block is milled to provide two parabolas which are on the same eccentric offset axis but do not have the same focus, with the relationships of their curvatures setting up the power of the telescope.

By use of the single piece of glass one can create a complete Cassegrain telescope in a single optical element in a small confined space.

The result is a block of glass with parabolas milled into its opposed surfaces that counteracts the effects of vibration, heat extremes and saturation. Note that if one were to have multiple optical elements, the coefficient of the expansion difference between the glasses and the supporting structure can result in alignment problems resulting in defocusing or adding astigmatism to the telescope. Thus, environmental factors become problematic in multi-element telescopes.

By making the telescope of a single piece of glass all with the same coefficient of expansion, all thermally induced problems are avoided because everything within the telescope moves together as a single universe. Thus, as the telescope heats up everything moves equally and there is automatic recompensation.

In short, all of the precision is built into the telescope itself. Therefore if the telescope were to be shifted slightly relative to the laser package it does not change initial laser alignment.

The savings in alignment is marked with the subject invention. Once the laser has been aligned with its housing, all that is necessary with the subject invention is to take the monolithic eccentric Mersenne-Cassegrain telescope and attach it to the laser housing.

In short with the subject telescope, precision is "machined in" rather than aligned at assembly. Critical surfaces cannot "get dirty" because they are within the "glass" body of the telescope. Critical alignments cannot change in harsh environments as they are part of the same structure. The telescope is smaller than equivalent telescopes and reflective systems are more compact. Moreover, mirrors do not introduce chromatic aberrations as do refractive systems and parabolas form a "perfect image" on axis.

In summary, what is provided in a single block of glass is a Mersenne-Cassegrain telescope in which opposed parabolic elements are precision milled through diamond turning of a glass boule, with the magnification power of the telescope determined by the differences in focal length between the two parabolas. The result is a volumetrically small telescope with pre-aligned surfaces that are maintained by the structural rigidity of the glass itself and in which thermal coefficients of expansion, vibration and the like have no effect due to the single glass element structure.

BRIEF DESCRIPTION OF THE DRAWINGS

These and other features of the subject invention will be better understood in connection with the Detailed Description, in conjunction with the Drawings, of which:

FIG. 10 is a cross sectional view of the telescope of FIG. 6 illustrating the mounting of the milled optical element in a housing which surrounds the barrel of the telescope and which is provided with an input beam aperture;

FIG. 11 is an isometric view of the telescope housing of FIG. 10 showing the output beam face of the telescope;

FIG. 12 is a bottom view of the housing of FIG. 10 illustrating the aperture for the input beam;

DETAILED DESCRIPTION

Figure 1:
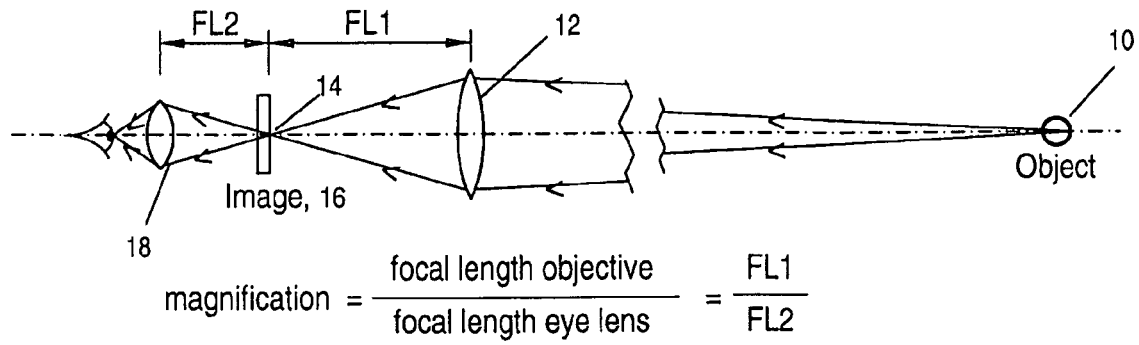
FIG. 1 is a diagrammatic illustration of a conventional telescope operating in the receive mode.

Referring now to FIG. 1, the conventional definition of a telescope is an optical instrument for enlarging the image of a distant object. Here it can be seen that an object 10 is viewed by an objective lens 12 which focuses the object to a focal point 14 to provide an image 16 of the object. Image 16 is viewed by an eye lens 18 such that when the image is viewed, the magnification is the focal length of the objective lens divided by the focal length of the eye lens. As will be appreciated, FIG. 1 shows a conventional telescope operated in a receive mode.

However, the telescope can also be used to compress a projected beam 20 in a transmit mode. In this case a primary optic or lens 22 is used to expand the incoming beam as illustrated at 24 so as to impinge on a secondary optic or lens 26 which expands and collimates the beam.

The diameter of the incoming beam is shown at $d_2$ having a included angle of $\theta_2$, whereas the output beam has a diameter $d_1$ with the beam subtending an angle $\theta_1$. Note in FIGS. 1 and 2 these optics may be lenses or mirrors, but the ratio of their focal lengths defines the magnification or power of the telescope.

Figure 2:
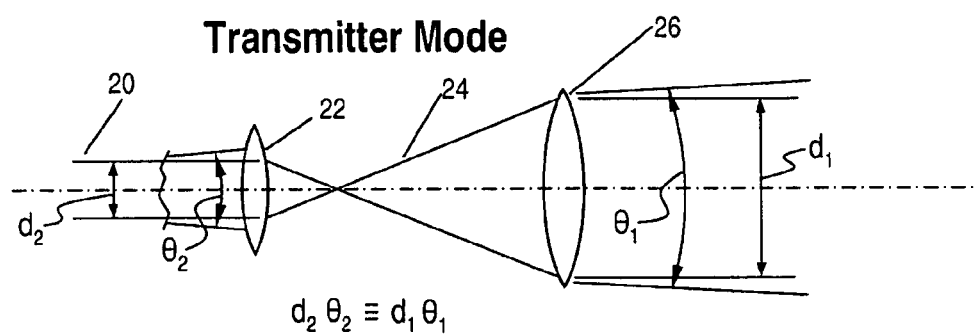
FIG. 2 is a diagrammatic illustration of a conventional telescope operating in the transmit mode.

As shown in FIGS. 1 and 2, these telescopes have real foci where collimated or parallel light beams come to an internal focus between the lenses.

Figure 3:
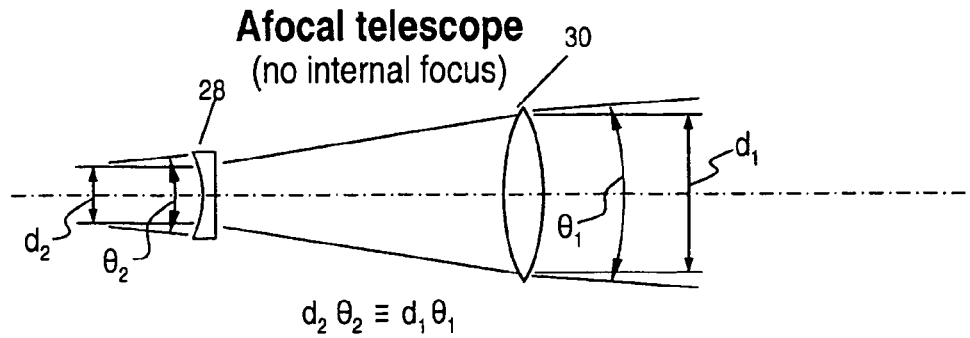
FIG. 3 is a diagrammatic illustration of a typical afocal telescope having no internal focus.

However as shown in FIG. 3, telescopes may take on the form of an afocal telescope where there is no internal focus between for instance a primary lens 28 and secondary lens 30.

Figure 4:
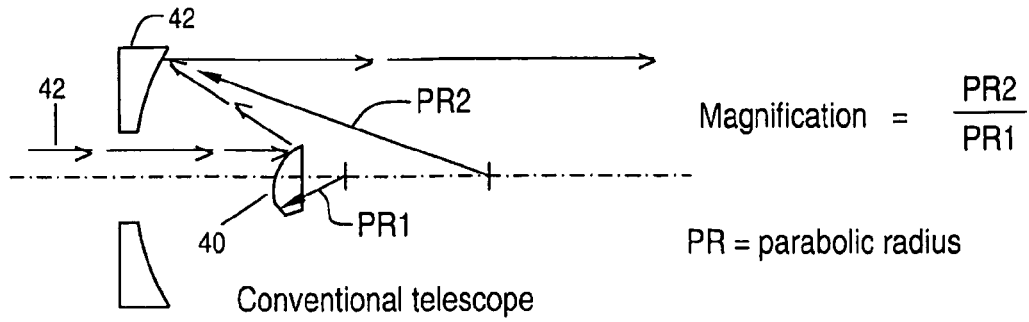
FIG. 4 is a diagrammatic illustration of a conventional Mersenne-Cassegrain telescope.

Referring to FIG. 4, what is depicted is a conventional Mersenne-Cassegrain telescope having a primary optic in the form of a parabolic reflector 40 on to which input beam 42 impinges. This beam is reflected by parabolic reflector 40 to the secondary optic 42 which is itself a parabolic surface out of which the expanded beam exits.

It is noted that the radius of parabolic reflector 40 is illustrated by PR1, whereas the radius of the parabolic reflector 42 is denoted by PR2. The magnification of the Mersenne-Cassegrain telescope is therefore PR2/PR1 or the ratios of the radii.

It is noted that for systems projecting high fluence laser beams, real focus is undesirable due to high energy levels in an optic, and afocal designs are preferred. It is also noted that relative positioning of the optics is critical for maintaining consistent beam pointing and wave front quality. Thus considerable effort is made developing stable assemblies.

Figure 5:
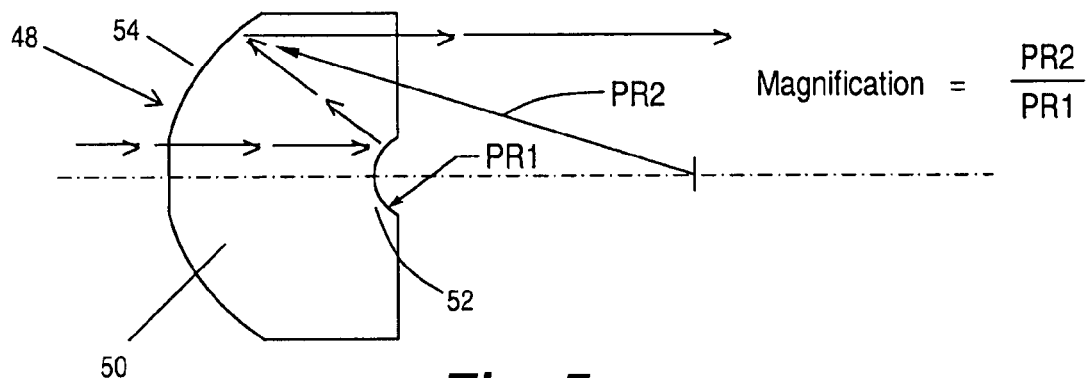
FIG. 5 is a diagrammatic illustration of a monolithic telescope fabricated from a single block of optical material having two parabolic exterior surfaces, showing the telescope being made from one half of a boule of the optical material into which the parabolic surfaces are milled.

How this is accomplished in the subject invention is shown by the monolithic telescope 48 of FIG. 5 made of a single block 50 of optical material. Here a single optical element such as glass is provided by milling the exterior of the glass to provide the necessary parabolas. Note, the telescope consists of a single piece of glass 50 in the form of a glass boule that is provided with parabolic surfaces for parabolas 52 and 54 through the Corning Glass milling technology mentioned above. Note that in the configuration shown there are two parabolic surfaces which are concentric or coaxial but with different radii.

Figure 6:
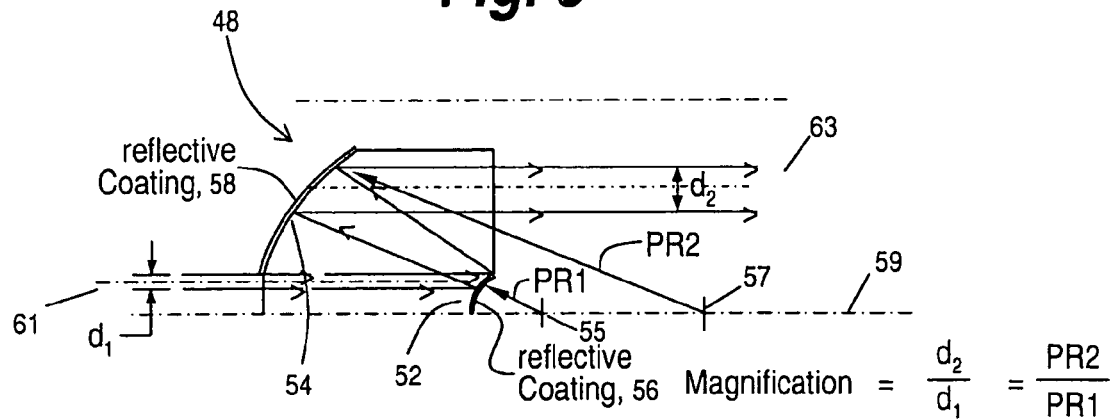
FIG. 6 is a diagrammatic illustration of a monolithic telescope formed from the boule of FIG. 5.

As shown in FIG. 6, the foci 55 and 57 of the parabolas of telescope 48 lie on the same axis 59 but at different locations on the axis. Also, the incoming beam axis 61 and the outgoing beam axis 63 are parallel to but offset from the common parabola axis 59 giving rise to the eccentric configuration of the subject telescope.

It is the different parabolic radii or PR, which create the telescope's magnification. Precision stability is achieved by configuring the two parabolic surfaces in a single piece of glass as shown in FIG. 5 using high precision diamond turning lathes so that nothing can change the relative locations of the parabolic surfaces that are milled into the glass.

Note there are limited number of materials that can be diamond turned, namely crystalline and amorphous materials. The process creates surface-to-surface relationships on the order of 0.10 to 0.15 wave RMS to 0.6 micron wavelength which quantifies a total through-put from the four surfaces and the internal bulk material, with the single optical material preserving the relationship over all environments.

This precision is far superior to conventional grinding/polishing techniques: Furthermore, as the reflective surfaces of the telescope are on the glass surface, the reflective coatings cannot be contaminated or "dirty" and thus subject to high energy laser damage.

As can be seen in FIG. 6, parabolic surfaces 52 and 54 of telescope 48 are provided with exterior reflective coatings 56 and 58, again with the magnification of $d_1/d_2$ equal to PR2/PR1 providing for an increase in beam diameter from $d_1$ to $d_2$.

Figure 7:
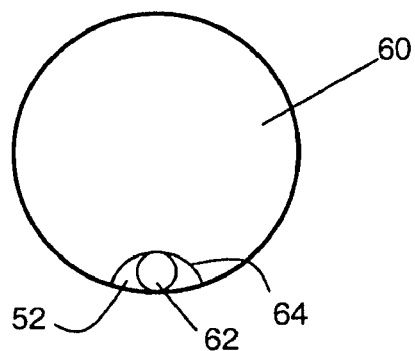
FIG. 7 is an end view of the telescope of FIG. 6 showing a flat input beam surface and a parabolic input beam reflector.

Referring to FIG. 7, the rear face 60 of telescope 48 includes a flat input surface 62, with the edge 64 of the parabolic 52 being visible as shown.

Figure 8:
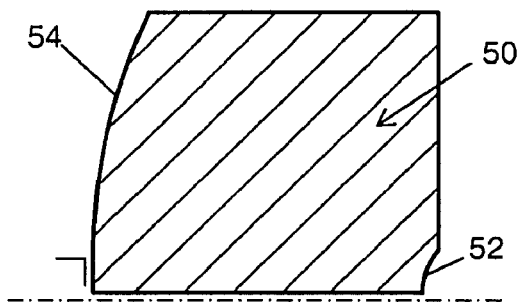
FIG. 8 is a cross sectional view of the telescope of FIG. 6 showing the concave parabolic surfaces making up the telescope.

As shown in FIG. 8, the two convex parabolic surfaces 52 and 54 of telescope 48 are shown having been milled into glass block 50 to form a monolithic structure.

Figure 9:
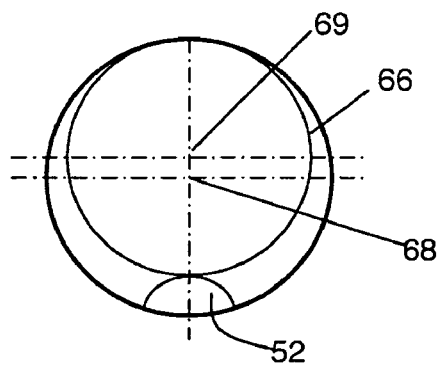
FIG. 9 is a front view of the telescope of FIG. 6 illustrating the area subtended by the output beam from the telescope, as well as the area subtended by the input beam parabolic surface.

Referring to FIG. 9 from the top view of telescope 48, region 66 defines the output beam from the telescope, the axis 68 of which is offset from the input beam axis 69.

In one embodiment, the housing for the monolithic telescope is illustrated in FIGS. 10, 11 and 12 in which housing 70 surrounds milled block 50 and has an input aperture 72 to admit the incoming beam 74 which is reflected by the parabola 52 towards the parabola 54, with the ray traces indicating an expansion of beam 74 to the diameter of output beam 76.

Referring to FIG. 11 looking at the top of the telescope, the exit surface 78 of telescope 48 is shown which also carries the milled parabolic surface of parabola 52.

Referring to FIG. 12, the telescope housing 70 for telescope 48 includes input beam orifice 74 as illustrated.

Figure 13:
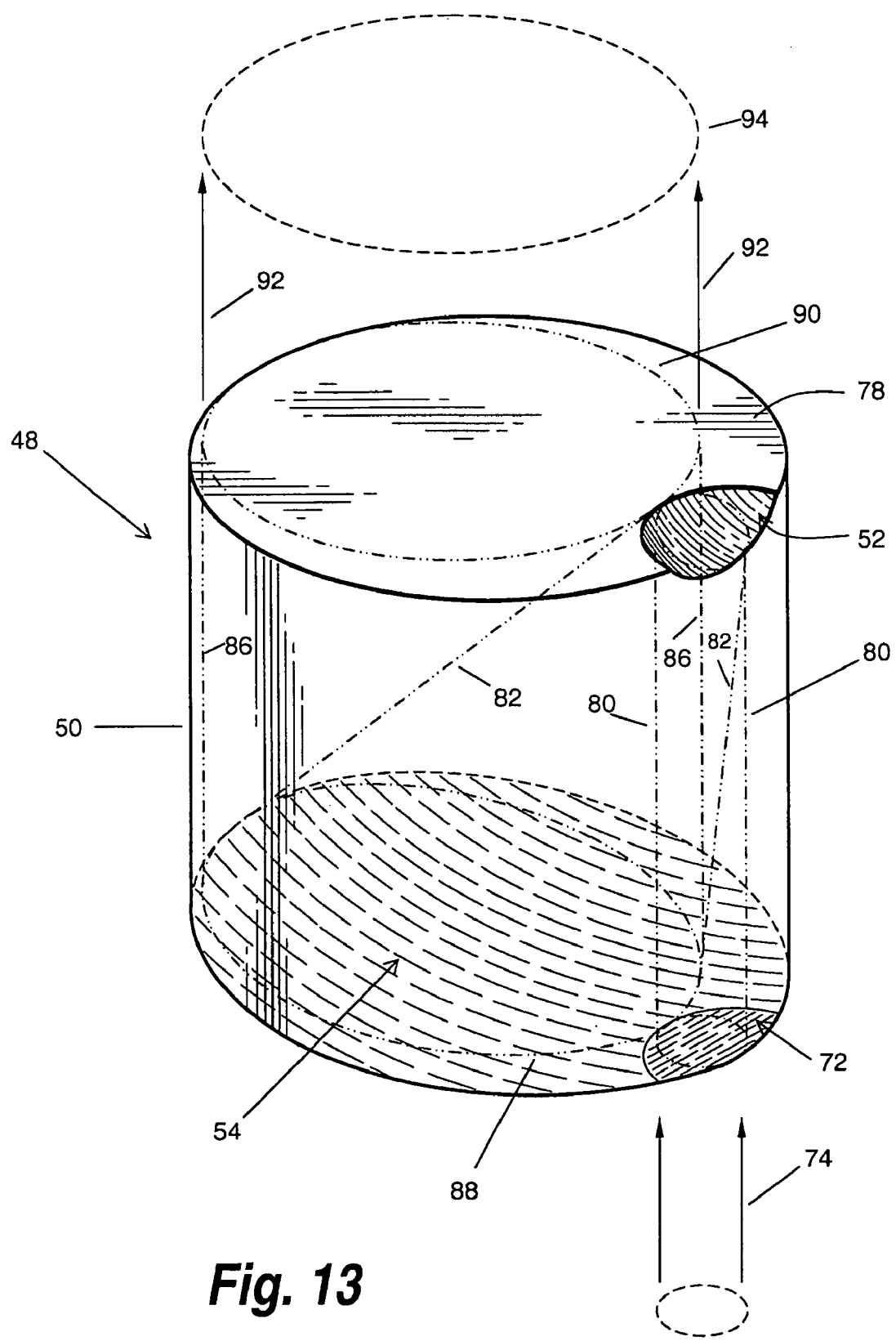
FIG. 13 is a diagrammatic and isometric view of the subject telescope illustrating a single glass block into which are milled the two parabolas, also showing an input beam reflected by a first parabolic surface to a second parabolic surface, with the exit of the beam reflected by the second parabolic surface; and, FIG. 14 is a diagrammatic and isometric bottom view of the telescope of FIG. 13.

Referring now to FIG. 13, what is shown in isometric view is telescope 48 made up of a single glass block 50 having the parabolic surface for parabola 52 milled into the top telescope surface 78. Also shown is the flat input surface 72 which input beam 74 traverses on its way to parabola 52 as shown by dotted lines 80. The reflected beam is shown by dotted lines 82 to impinge on the reflective parabolic surface of parabola 54, with the reflected beam having a diameter 86.

The reflective surface of parabola 54 on the exterior of the glass block reflects the incident light in a collimated manner out of the telescope as shown by dotted lines 86 which projects the expanded incoming beam out in a collimated fashion through face 78. Here the exit beam has the diameter illustrated in dotted outline at 90. Thereafter as illustrated by arrows 92 the beam is projected out to subtend the area illustrated by dotted line 94.

It is noted that the both incoming beam axis and the outgoing beam axis are offset from the axis on which the foci of the parabolas lie, giving rise to the eccentric configuration.

Figure 14:
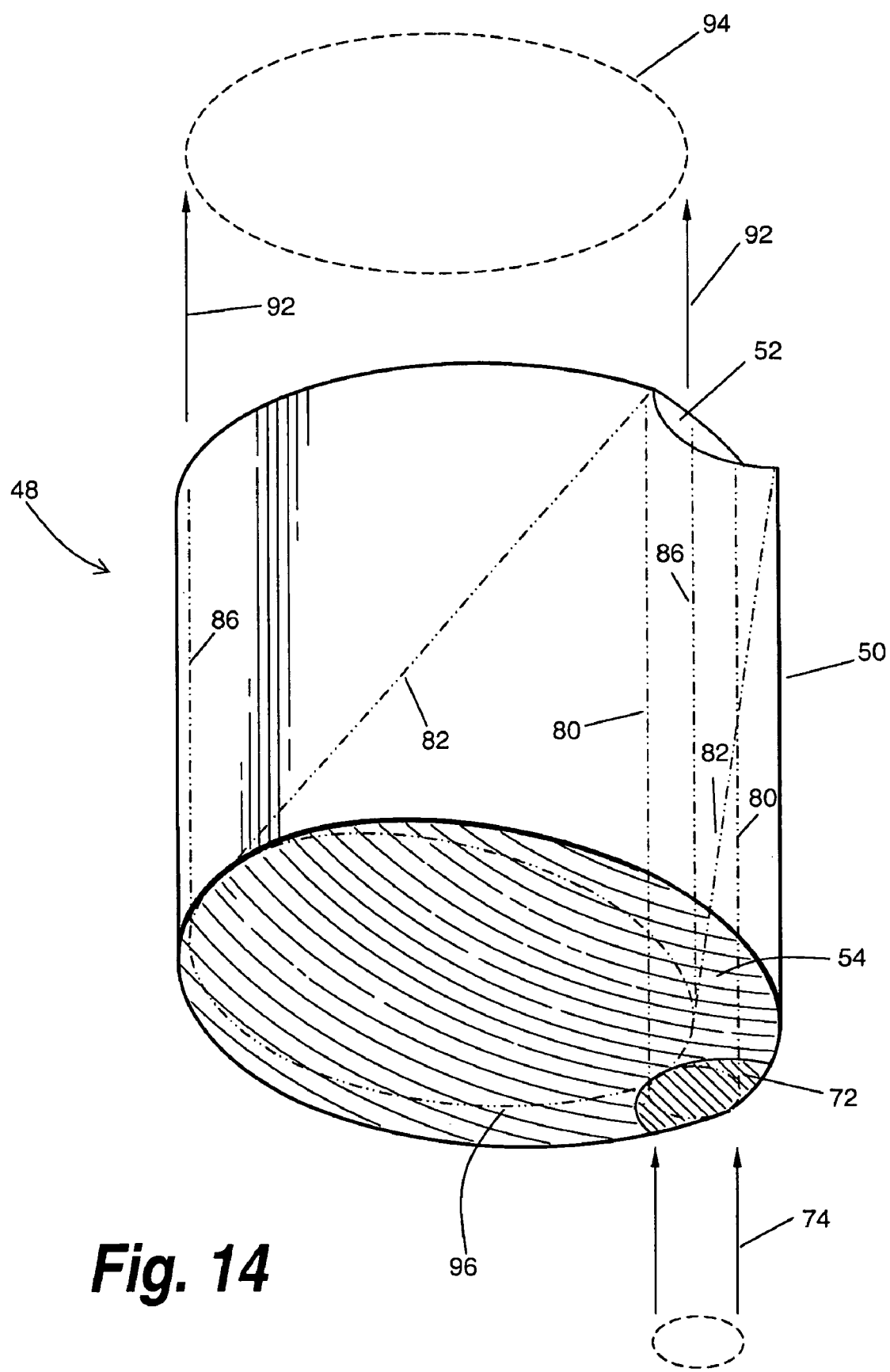

Referring to FIG. 14, what is shown is an isometric view of the monolithic telescope 48 of FIG. 13 looking up from the bottom of the glass block. Here it can be seen that flat surface 72 is ground into the parabolic surface of parabola 54 so that the incoming beam 74 passes through flat surface 72 on its way to the parabolic surface of parabola 52. The reflected incoming beam is redirected by the parabolic surface of parabola 52 to the parabolic surface of parabola 54 as illustrated by dotted lines 82 and impinges as shown by dotted circle 96 on the parabolic surface of parabola 54. Thereafter, as illustrated by dotted lines 86, the expanded and collimated beam as illustrated by dotted lines 86 exits telescope 48 as illustrated at 92 so as to have the beam diameter illustrated at 94.

What is therefore shown is a monolithic telescope having parabolic surfaces milled into opposed ends of a block of glass to provide an eccentric offset beam that is highly collimated. The monolithic telescope is unaffected by environmental factors which makes the telescope extremely rugged, miniaturized and usable in any manner of laser applications.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A compact monolithic telescope comprising:
    a single block of optical material having opposed parabolic elements precision milled into opposing ends of said block, an input end of said block carrying one of said parabolic elements and an exit end of said block carrying the other of said parabolic elements; and,
    a flat surface in the parabolic element at the input end to admit an input beam of light towards the parabolic element at said exit end; and, reflective material on the precision milled areas, whereby said input beam is reflected by the parabolic element at said exit end towards the parabolic elements at said input end and wherein the reflective coating on said parabolic element at said input end produces a collimated beam out of said block at said exit end.

2. The telescope of claim 1, wherein the foci of said parabolic elements lie on a common axis at different points along said common axis, whereby the focal lengths of said parabolic elements are different and wherein the ratio of said focal lengths determines the magnification of said telescope.

3. The telescope of claim 1, wherein said optical material is taken from the group consisting of amorphous and crystalline material.

4. The telescope of claim 1, wherein said optical material includes glass.

5. The telescope of claim 1, wherein said precision milling is provided by a precision-lathe.

6. A method for making a Mersenne-Cassegrain telescope having opposed parabolic elements precision milled into a single block of glass, comprising the step of:
    milling the parabolic elements using diamond turning of the single block of glass to provide milled surfaces, one of the parabolic elements being at the input end of the block of glass, the precision milling including milling a flat to one side of the parabolic element at the input end of the telescope to permit introduction of a light beam into the telescope; and,
    coating the surfaces with reflective material.

7. The method of claim 6, wherein the foci of the parabolic elements lie on a common axis and are separated one from the other to provide different focal lengths for the parabolic elements.

8. The method of claim 6, wherein the telescope is an eccentric monolithic telescope.

9. The method of claim 6, wherein the telescope is a monolithic Mersenne-Cassegrain telescope.

10. The method of claim 6, wherein an input beam is injected into the input end of the telescope along a line parallel to the common axis on which the foci are located and wherein the exit beam from the parabolic element at the input end lies along an axis parallel to the input axis of the injected beam, the input and output axes being offset from the common axis on which the foci of the parabolas are located.

11. A method for making a Mersenne-Cassegrain telescope having an input and exit end and pre-aligned surfaces that are impervious to thermal coefficients of expansion, vibration, and contamination comprising the steps of:
    manufacturing the Mersenne-Cassegrain telescope out of a monolithic single block of optical material having opposed parabolic surfaces milled into the material such that the surfaces are pre-aligned due to the use of the single block of optical material, one of the opposed parabolic surfaces having a flat surface at an input end of the telescope to admit an input beam of light towards the other of the opposed surfaces at an exit end of the telescope; and,
    coating the milled parabolic surfaces with a reflective material such that no dirt can enter between the parabolic surfaces due to the monolithic structure of the telescope, the use of a single block of optical material providing structural rigidity for maintaining the alignment of the pre-aligned surfaces.

12. The method of claim 11, wherein the optical material includes glass.

13. The method of claim 11, wherein the foci of the milled parabolic surfaces lie along a common axis and are separated to provide the corresponding parabolic element with different focal lengths, the ratio of the focal lengths determining the magnification of the telescope.

14. A method for providing a miniaturized rugged telescope having an input and output end, and housed in a gimbal of a laser pointing system, comprising:
    making the telescope from a single block of optical material, the material being milled to provide a Mersenne-Cassegrain telescope having opposed parabolic elements in the surface thereof, one of the opposed parabolic surfaces having a flat surface at an input end of the telescope to admit an input beam of light towards the other of the opposed surfaces at an exit end of the telescope; and,
    providing the opposed parabolic element with reflective material, whereby the telescope is compact and pre-aligned due to the milled-in alignment of the parabolic elements.

15. The method of claim 14, wherein the optical material includes glass and wherein the milling of the glass includes diamond turning on a very high precision lathe running on air bearings, whereby the glass is shaped to a very fine surface finish such that the milled surfaces have a good relationship one surface to the other, whereby when the telescope is used at the exit port of a laser, initial laser alignment is not affected and wherein the optical elements of the Mersenne-Cassegrain telescope are self-aligned.

16. The method of claim 15, wherein the telescope is an eccentric monolithic Mersenne-Cassegrain telescope.

* * * * *